United States Patent [19]

Wallick et al.

[11] 4,022,483
[45] May 10, 1977

[54] SIDE CAR ATTACHMENT FOR MOTORCYCLES

[76] Inventors: Clarence H. Wallick, 6141 Orange Ave., Cypress, Calif. 90630; Ghraydon Lynn Wallick, 1926 Placentia No. 9, Costa Mesa, Calif. 92627

[22] Filed: Oct. 14, 1975

[21] Appl. No.: 622,145

[52] U.S. Cl. .................................. 280/203; 280/711
[51] Int. Cl.² ........................................ B62K 27/02
[58] Field of Search ........... 180/203, 204; 280/711, 280/712, 713, 714

[56] References Cited

UNITED STATES PATENTS

| | | | |
|---|---|---|---|
| 1,077,210 | 10/1913 | Alesani | 280/203 |
| 1,077,743 | 11/1913 | Overton | 280/203 |
| 1,080,020 | 12/1913 | Pothast | 280/203 |
| 1,094,777 | 4/1914 | Buckland | 280/203 |
| 1,437,115 | 11/1922 | Morton | 280/203 |
| 2,702,196 | 2/1955 | Gamaunt | 280/203 |
| 2,793,051 | 5/1957 | Izumi | 280/203 |
| 3,276,476 | 11/1963 | Jackson | 280/714 X |
| 3,664,681 | 5/1972 | Thaxton | 280/712 |
| 3,666,288 | 5/1972 | Carton et al. | 280/713 |
| 3,854,710 | 12/1974 | Nicholls | 280/702 |

FOREIGN PATENTS OR APPLICATIONS

| | | | |
|---|---|---|---|
| 19,597 | 3/1915 | France | 280/203 |
| 27,735 | 1913 | United Kingdom | 280/203 |
| 17,188 | 1913 | United Kingdom | 280/203 |

*Primary Examiner*—Joseph F. Peters, Jr.
*Assistant Examiner*—Jack D. Rubenstein
*Attorney, Agent, or Firm*—Fulwider, Patton, Rieber, Lee & Utecht

[57] ABSTRACT

A frame for attaching a side car to the frame of a motorcycle. The attachment frame includes parallel upper and lower rails which are connected at their front ends to the motorcycle frame by a parallelogram linkage for simultaneous tilting movement of the front portions of the attachment and motorcycle frames. The rear portion of the attachment frame is pivotally connected to an auxiliary wheel which is disposed beneath the attachment frame directly adjacent to the motorcycle. The attachment frame carries means for connecting a side car outwardly from the attachment frame and auxiliary wheel. The connection between the rear portions of the frames comprises a roller mounted for movement along a normally vertical track to provide independent movement of the frames and form an axis for tilting movement of the attachment frame. An air cylinder provides adjustable support for the load carried by the attachment frame.

4 Claims, 11 Drawing Figures

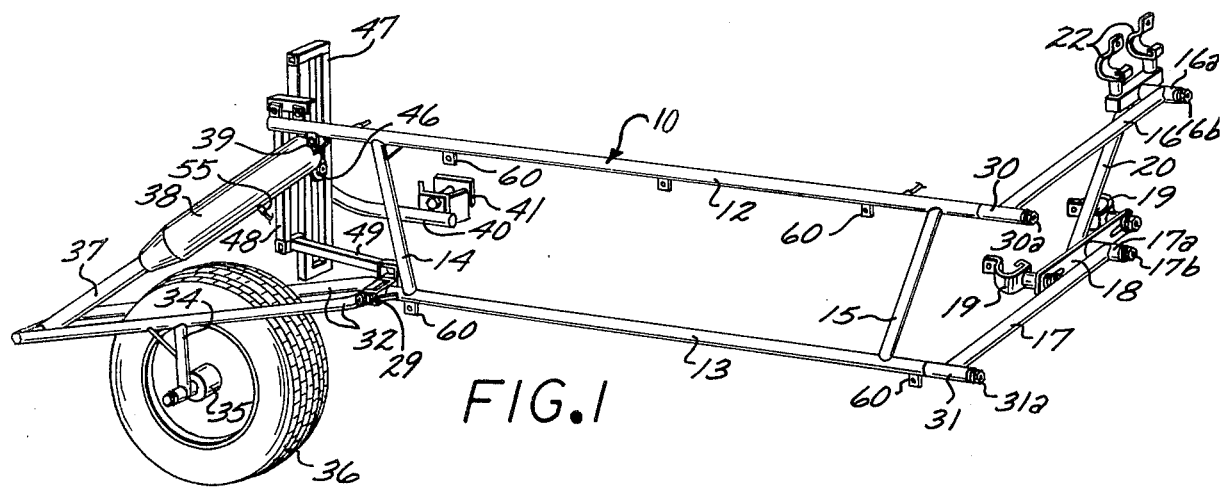
FIG.1
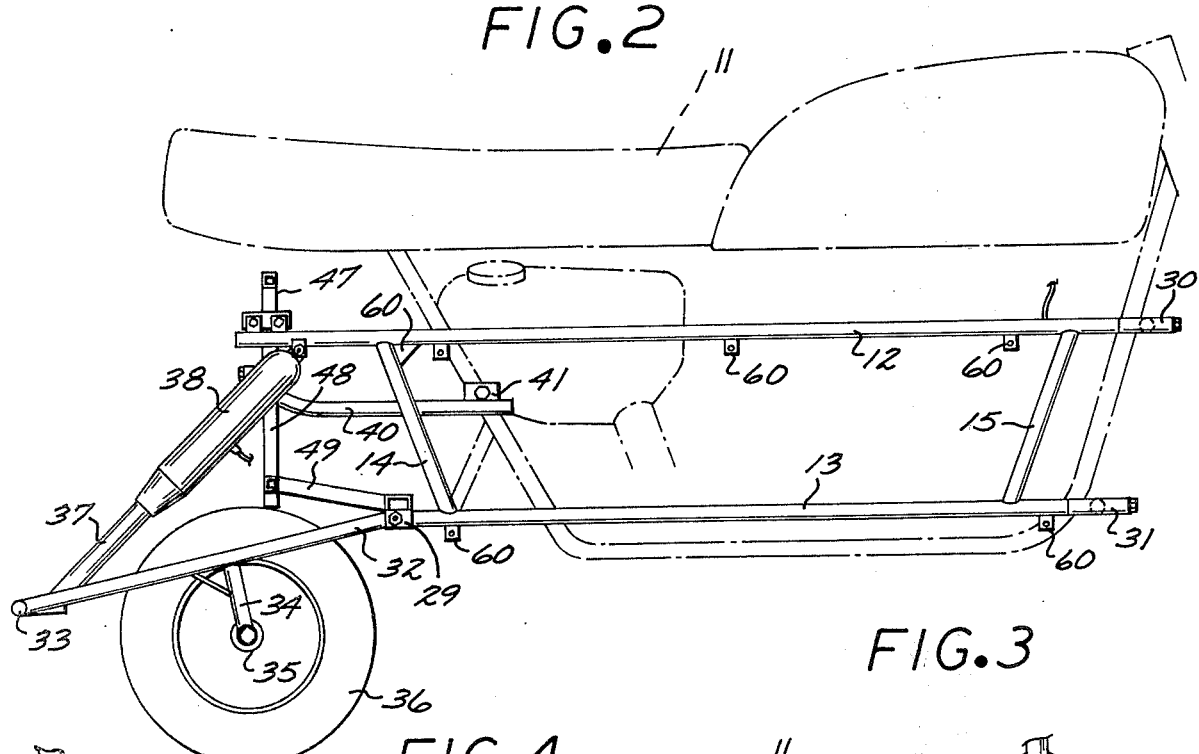
FIG.2
FIG.3
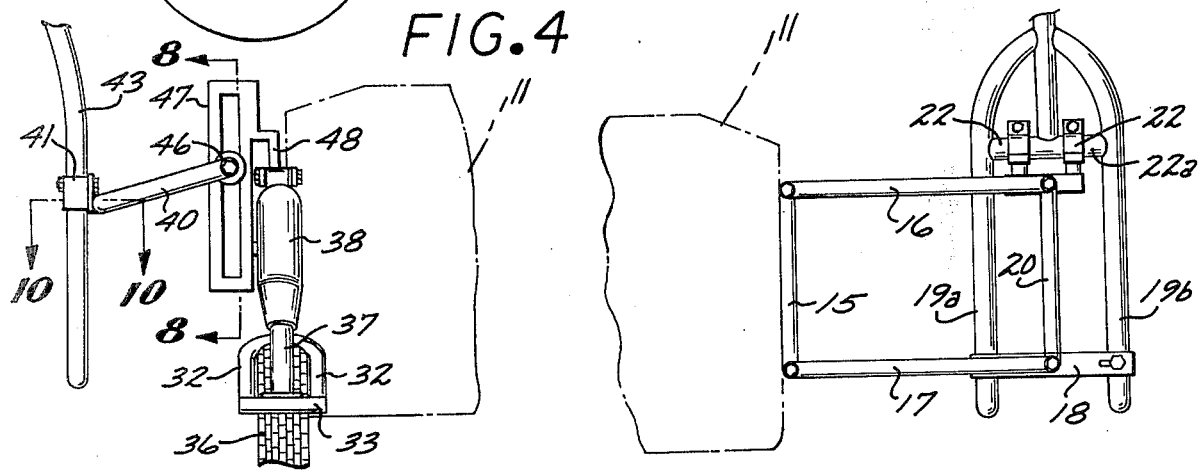
FIG.4

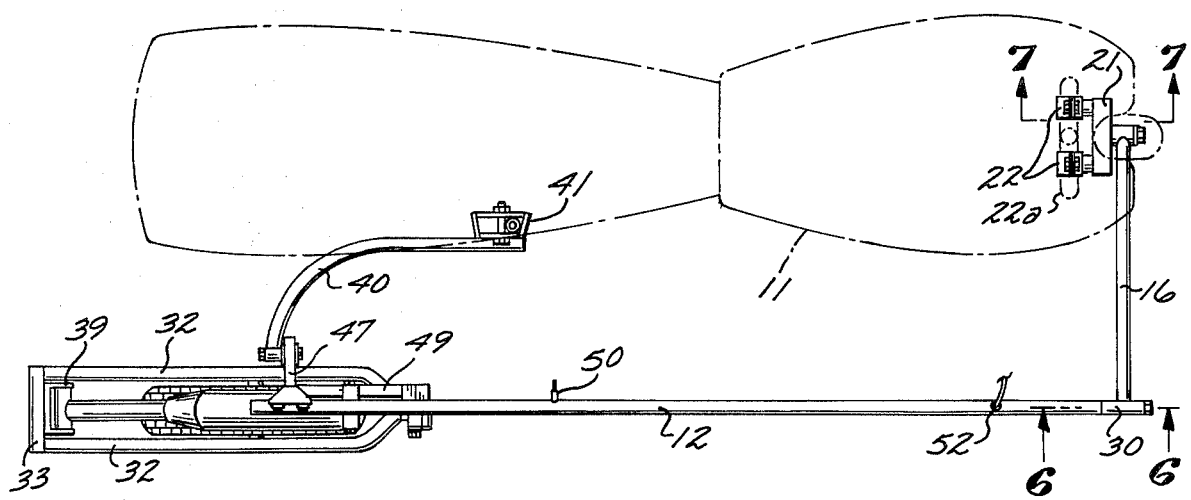
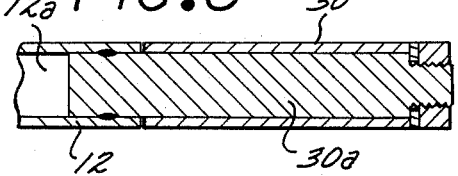
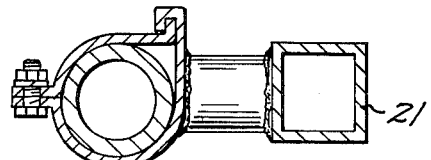
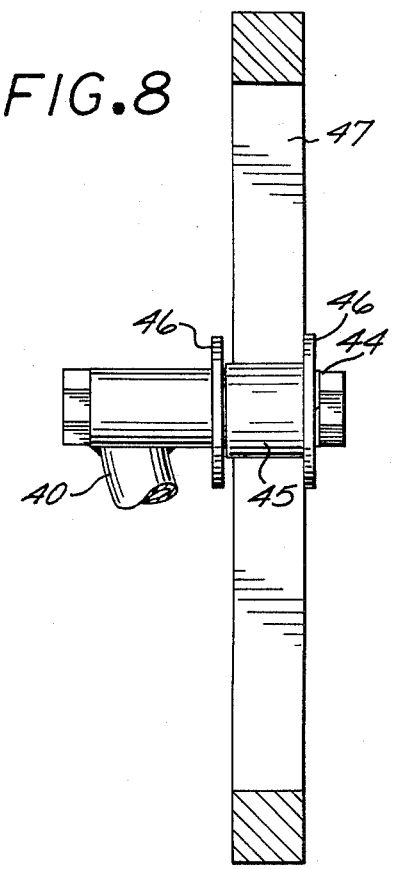
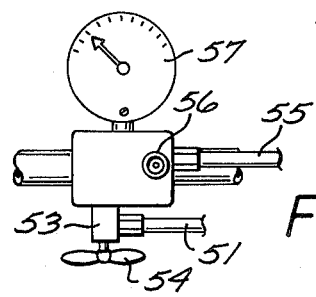
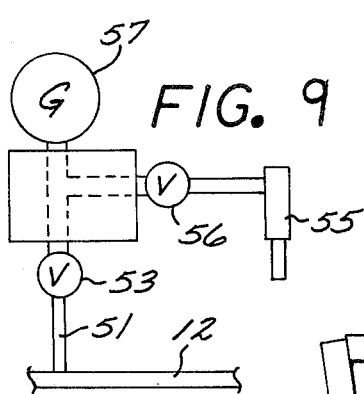
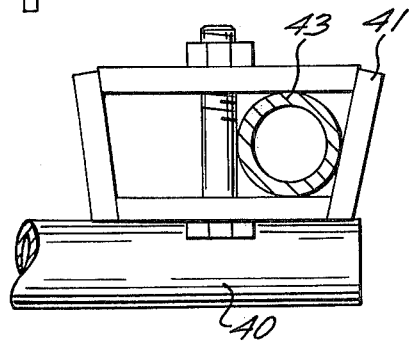

SIDE CAR ATTACHMENT FOR MOTORCYCLES

BACKGROUND OF THE INVENTION

1. Field of the Invention

The invention relates to a structure for attaching a side car to a motorcycle.

2. Description of the Prior Art

Side car attachments of the type now in use impose a substantial proportion of their loads directly upon the motorcycle. This often puts undue undesirable strain on the motorcycle frame, suspension and tires.

Existing side cars and attaching structures are customarily rigid or substantially rigid and they accordingly interfere with the maneuverability of the motorcycle to which they are attached. They also impose upon the motorcycle stress resulting from irregular road conditions encountered by the side car.

The auxiliary wheel which supports a conventional side car is always disposed a substantial distance outwardly from the motorcycle on the opposite side of the side car.

Some prior art devices have used conventional shock absorbers to carry the load of the side car and its contents. This does not adequately compensate for the added weight and the driver of the motorcycle customarily experiences difficulty in steering in a straight line, as well as in leaning the motorcycle and side car into a turn and then back to a straight line.

It is necessary to attach the front of the side car attachment to the forward part of a modern motorcycle. When the rear of the attachment is connected to the rear wheel, as is customary, road shocks received by the rear wheel of the motorcycle are transferred to the side car. This point of attachment is accordingly undesirable.

The geometric variations which occur during movement of the motorcycle and side car make it unfeasible to employ simple linkage between the motorcycle and side car. Variations in the distances from the center line of the motorcycle to the center line of the side car cause scrubbing and high wear on the auxiliary side car tire as the alignment between the motorcycle and side car constantly changes.

SUMMARY OF THE INVENTION

The present invention provides a novel side car attachment for motorcycles which makes it possible to carry heavy loads in the side car without putting undue strain on the motorcycle frame, suspension or tires. At the same time, it does not interfere with the maneuverability of the motorcycle, which remains substantially the same as if the side car were not attached.

The present invention employs a flexible mounting arrangement as opposed to the rigid mounting systems of the prior art. With the present invention, the side car is substantially independent of the motorcycle and does not impose on the motorcycle any of the load or strain from road conditions, as do existing attachments.

The auxiliary wheel which supports the side car of the present invention is disposed directly adjacent to the motorcycle in what may be termed an inboard position, as opposed to the outboard position of the prior art. The auxiliary wheel is actually aligned with the inner edge of the side car, while in the prior art it is disposed outwardly beyond the outer edge of the side car.

The invention further provides for the use of an air cylinder to compensate for the added weight of the side car and its contents or occupant. Proper adjustment of the cylinder can be made by adding or releasing the necessary amount of air, while part of the attachment frame may be used as a pressure reservoir for the air cylinder. It thus becomes effortless for the driver to lean the motorcycle into turns and to return the motorcycle and side car to an upright position.

The invention provides a parallelogram structure which is attached to the front down bar of the motorcycle frame. It preferably extends from far forward to a far backward swing-arm type suspension which supports the auxiliary side car wheel.

The present invention prevents undesirable wear of the auxiliary tire by providing a structure which maintains a constant distance between the center lines of the motorcycle and side car. This not only eliminates excess tire wear, but also relieves the stresses on both the motorcycle and side car which result from the use of a simple pivot type linkage.

With the present invention, the motorcycle and side car can tilt in either direction to an extreme degree while still maintaining a constant distance between the rear wheel of the motorcycle and the auxiliary wheel of the side car. This avoids stresses on the motorcycle and side car frames.

While there is shown in the accompanying drawings a preferred embodiment of the invention, it should be understood that the same is susceptible of modification and change without departing from the spirit of the invention.

DESCRIPTION OF THE DRAWINGS

FIG. 1 is a perspective view of the attachment frame;

FIG. 2 is a side elevational view of the attachment frame, with the motorcycle shown in phantom lines;

FIG. 3 is a front elevational view showing the attachment frame connected to a portion of the motorcycle frame, with a portion of the side car shown in phantom lines;

FIG. 4 is a rear elevational view showing the connection between the attachment frame and a portion of the motorcycle frame, with the side car shown in phantom lines;

FIG. 5 is a top plan view of the attachment frame, with the motorcycle shown in phantom lines;

FIG. 6 is an enlarged partial sectional view taken on line 6—6 of FIG. 5;

FIG. 7 is an enlarged partial sectional view taken on line 7—7 of FIG. 5;

FIG. 8 is an enlarged partial sectional view taken on line 8—8 of FIG. 4;

FIG. 9 is a schematic view of the air pressure supply system.

FIG. 10 is an enlarged partial sectional view taken on line 10—10 of FIG. 4;

FIG. 11 is an elevational view of the air pressure supply members which are mounted on the motorcycle; and

DESCRIPTION OF THE PREFERRED EMBODIMENT

A preferred embodiment which has been selected to illustrate the invention comprises a rigid attachment frame 10, which is attached to the frame of a conventional motorcycle 11, so as to extend along one side thereof in substantially parrallel relation.

The frame 10 includes a horizontal upper rail 12 and a substantially parallel lower rail 13, which are connected by a pair of slightly angular vertical rails 14 and 15. Extending transversely inwardly toward the motorcycle from the front ends of the upper and lower rails 12 and 13 are an upper front rail 16 and a lower front rail 17, respectively forming part of a parallelogram linkage between the motorcycle and attachment frames.

Attached to the opposite end of the upper front rail 16 is a horizontally directed tube 16a, which is rotatably mounted on a bolt 16b. The opposite end of the lower front rail 17 is likewise attached to a tube 17a which is rotatably mounted on a bolt 17b.

Attached to the rear end of the bolt 17a is a flat lower bar 18 having a pair of clamps 19 adjustably mounted adjacent its opposite ends. A connector rail 20 extends vertically upwardly from the midportion of the bar 18 to the midportion of an upper bar 21 of square cross section which is attached to the bolt 16b. The bar 21 has a pair of clamps 22 disposed adjacent its opposite ends.

When the frame 10 is attached to the motorcycle 11, members 18 and 21 extend across the front of the motorcycle behind the front wheel. The clamps 19 are attached to a pair of vertically directed tubular members 19a and 19b which comprise part of the frame of the motorcycle 11. (FIGS. 3 and 7) The clamps 22 are attached to a horizontal tubular portion 22a of the motorcycle frame. (FIG. 3) It will be obvious to those skilled in the art that the particular clamps and the means and method of attachment will vary, depending upon the structure of the particular motorcycle to which the frame 10 is attached.

Referring to FIG. 6 of the drawings, the end of the upper rail 12 to which the upper front rail 16 is attached comprises a hollow sleeve 30, which is mounted for rotation around a fixed core 30a. The sleeve 30 is accordingly free to rotate with respect to the remainder of the upper rail 12. The forward end of the lower rail 13 to which the lower front rail 17 is attached comprises a similar hollow sleeve 31, which is mounted for rotation around a fixed core 31a. The sleeve 31 is accordingly free to rotate with respect to the remainder of the lower rail 13.

The rear end of the lower rail 13 directly behind its attachment to the vertical rail 15 is connected to a yoke 29. Pivotally connected to the yoke 29 are a pair of rearwardly directed wheel rails 32, the rear ends of which are connected by a cross rail 33. A pair of short rails 34 extend downwardly from the midportions of the wheel rails 32 to the axle 35 of the auxiliary wheel 36.

The cross rail 33 is pivotally attached at its midportion to the end of the piston 37 of an air cylinder 38. The piston 37 and cylinder 38 extend in a diagonal direction, the opposite end of the cylinder 38 being pivotally connected to a yoke 29 which is in turn connected to the rear end of the upper rail 12.

The connection between the rear portions of the motorcycle 11 and frame 10 comprises a support element or curved rail 40, one end of which extends in a forward horizontal direction adjacent to the rear portion of the motorcycle frame. This end of the curved rail 40 carries a clamp 41, which is adapted to be attached to a pair of adjacent tubular portions 42 and 43 of the frame of the motorcycle 11, as shown in FIG. 9.

The opposite end of the curved rail 40 extends in a transverse direction and is attached to an axle 44 on which a follow or roller 45 is mounted for rotation. A pair of circular side plates 46 are disposed on opposite sides of the roller 45. The roller 45 travels in a vertical direction along a vertically directed rectangular track 47, as shown in FIGS. 4 and 8.

One side of the track 47 is secured to a vertical member 48, the lower end of which is attached to the rear end of a substantially horizontal bar 49 of square cross section. The forward end of the bar 49 is secured to the yoke 29 referred to above.

FIGS. 10 and 11 illustrate physically and schematically a hydraulic system used to operate the air cylinder 38. In utilizing the air cylinder 38, the upper rail 12 of the frame 10 may be used as an air pressure supply tank. The rail 12 has a hollow portion 12a which extends from adjacent to the core 30a rearwardly to adjacent the opposite end of the upper rail 12.

Air under pressure such as that available at a service station may be inserted into the hollow portion 12a through a valve 50. A hose 51 extends from a connection 52 adjacent to the front of the upper rail 12 to a control valve 53 on crossmember (16). A knob 54 controls the opening and closing of the valve 53 to supply air through a hose 55 which is connected at one end of the valve 53 and at its opposite end to the air cylinder 38. A manually operable relief valve 56 is provided to vent air pressure from the cylinder 38 to the atmosphere. A gauge 57 indicates the pressure within the air cylinder 38.

The rails 12 and 13 are provided with a plurality of lugs 60 or other suitable means for attachment of a side car or other load upon the frame 10.

In use, the parallel front rails 16 and 17 are pivotally secured at their inner ends to the frame of the motorcycle 11 and at their outer ends to the attachment frame 10. They accordingly function as a parallelogram linkage which causes the forward end of the frame 10 to pivot angularly in the same direction and to the same degree as the frame of the motorcycle 11.

The rear of the frame 10 is supported by the wheel 36, but the front is unsupported except for its attachment to the motorcycle 11. The diagonal or upwardly and forwardly sloped piston 37 and cylinder 38 tend to keep the front of the frame 10 from dipping downwardly.

As the front of the frame 10 is tilted by the parallelogram linkage, the rear portion of the frame 10 will pivot about the roller 45. The entire frame 10 thus tilts to exactly the same degree and at exactly the same time as the motorcycle 11. This avoids any stresses developing between them.

The roller 45 and track 47 serve several functions in addition to providing a pivotal axis for the frame 10 as described above. When the motorcycle 11 encounters a road shock and its frame moves upwardly or downwardly, the curved rail 40 and roller 45 move with it, but such movement is not transmitted to the attachment frame 10. Likewise, if the auxiliary wheel 36 encounters a road shock, the track 47 is free to move in either vertical direction with respect to the roller 45, so that the shock is not transmitted to the motorcycle 11.

The track and roller assembly accordingly accommodates independent vertical movement in either direction by either the motorcycle 11 or frame 10 and also permits tilting movement of the frame 10 in either direction. As seen in the drawings, such tilting movement occurs about an axis generally parallel to the attachment frame and passing through the roller 45.

The unique connection between the frame of the motorcycle 11 and the attachment frame 10 acts to maintain a constant distance between the center lines of the motorcycle and side car. This eliminates excess tire wear and relieves stress which would result from a pivot type of connection.

The air cylinder 38 permits a large range of variability in the load carried by the attachment frame 10. When a heavy load is imposed, such as a side car becoming occupied by a passenger, the driver need only operate the knob 54 to increase the pressure in the air cylinder 38 to accommodate the load. When the load is discharged, air can be bled from the cylinder 38 by the relief valve 55 to adjust it. Minor variations in the load are absorbed by vertical movement of the track 47 with respect to the roller 45, so that such variations do not impose stress upon the frame of the motorcycle 11.

I claim:

1. A side car attachment for a motorcycle, said attachment comprising:
    an elongated attachment frame having a forward extremity and a rear extremity for location adjacent one side of a motorcycle frame;
    transversely extending parallelogram linkage means coupled to the forward extremity of said attachment frame and adapted to be coupled to said motorcycle frame for tilting said attachment frame in correspondence with tilting of said motorcycle frame;
    wheel means carried by said attachment frame for supporting said attachment frame; and
    connecting means for coupling the rear extremity of said attachment frame to said motorcycle frame, said connecting means including track means defining a track which is generally vertically oriented in the upright positions of said attachment frame and said motorcycle frame; and follower means comprising a follower rotatable within said track to permit tilting of said attachment frame relative to said motorcycle frame, said follower further being movable along said track, one of said track means and said follower means being coupled to said attachment frame, and the other of said track means and said follower means being adapted for coupling to said motorcycle frame.

2. A side car attachment according to claim 1, wherein said follower comprises a roller adapted to be coupled to said motorcycle frame, said track means is coupled to said attachment frame, and said roller is rotatable about an axis generally parallel to said attachment frame.

3. A side car attachment according to claim 1 wherein said attachment frame includes an air cylinder extending substantially diagonally between said attachment frame and said wheel means to accommodate variations in the relative positions of said attachment frame and said wheel means.

4. A side car attachment according to claim 3 wherein said attachment frame includes an element having a hollow portion adapted to receive and maintain air under pressure; and further comprising means for supplying air from said element to said air cylinder.

* * * * *